(12) United States Patent
Kuribara et al.

(10) Patent No.: US 12,735,098 B2
(45) Date of Patent: Sep. 15, 2026

(54) TRAVELING CONTROL DEVICE, TRAVELING CONTROL METHOD, AND STORAGE MEDIUM

(71) Applicant: HONDA MOTOR CO., LTD., Tokyo (JP)

(72) Inventors: Ayana Kuribara, Tokyo (JP); Yuki Imanishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/035,951

(22) Filed: Jan. 24, 2025

(65) Prior Publication Data

US 2025/0242861 A1 Jul. 31, 2025

(30) Foreign Application Priority Data

Jan. 26, 2024 (JP) ................................ 2024-010388

(51) Int. Cl.
*B62D 6/04* (2006.01)
*B62D 6/00* (2006.01)

(52) U.S. Cl.
CPC ............... *B62D 6/04* (2013.01); *B62D 6/002* (2013.01)

(58) Field of Classification Search
CPC ........ B62D 15/025; B62D 6/00; B62D 6/002; B62D 6/004; B60W 40/06; B60W 30/12; B60W 30/18163; B60W 2554/80
See application file for complete search history.

(56) References Cited

U.S. PATENT DOCUMENTS 5,107,932 A * 4/1992 Zachman ................ E02F 3/845 172/1
12,049,271 B1 7/2024 Saito et al.
2004/0215384 A1* 10/2004 Kummel ............... B60W 30/02 701/48
2015/0298691 A1* 10/2015 Kodaira ................ B60W 30/10 701/48
2018/0170377 A1* 6/2018 Tatsukawa ............ B60W 30/12
2019/0299998 A1* 10/2019 Sakurada .......... B60W 50/0098
2020/0172102 A1* 6/2020 Hirota ................... B60W 10/18

FOREIGN PATENT DOCUMENTS

JP 7028115 B2 3/2022
WO WO 2022/259552 A1 12/2022

* cited by examiner

*Primary Examiner* — Hai H Huynh
*Assistant Examiner* — Johnny H Hoang
(74) *Attorney, Agent, or Firm* — Paratus Law Group, PLLC

(57) ABSTRACT

A traveling control device that controls traveling of a vehicle along a target trajectory, includes: a cant acquisition unit configured to acquire a cant angle indicating a degree of inclination in a lateral direction of a road surface on which the vehicle travels; a deviation calculation unit configured to calculate a lateral deviation between a position of the target trajectory and a position of the vehicle in the lateral direction; and a control unit configured to calculate a target steering angle of the vehicle based on the cant angle and the lateral deviation and control steering of the vehicle to follow the target steering angle. A feedback term of the target steering angle calculated based on the cant angle and the lateral deviation is provided with a limit variably set according to the cant angle.

9 Claims, 4 Drawing Sheets

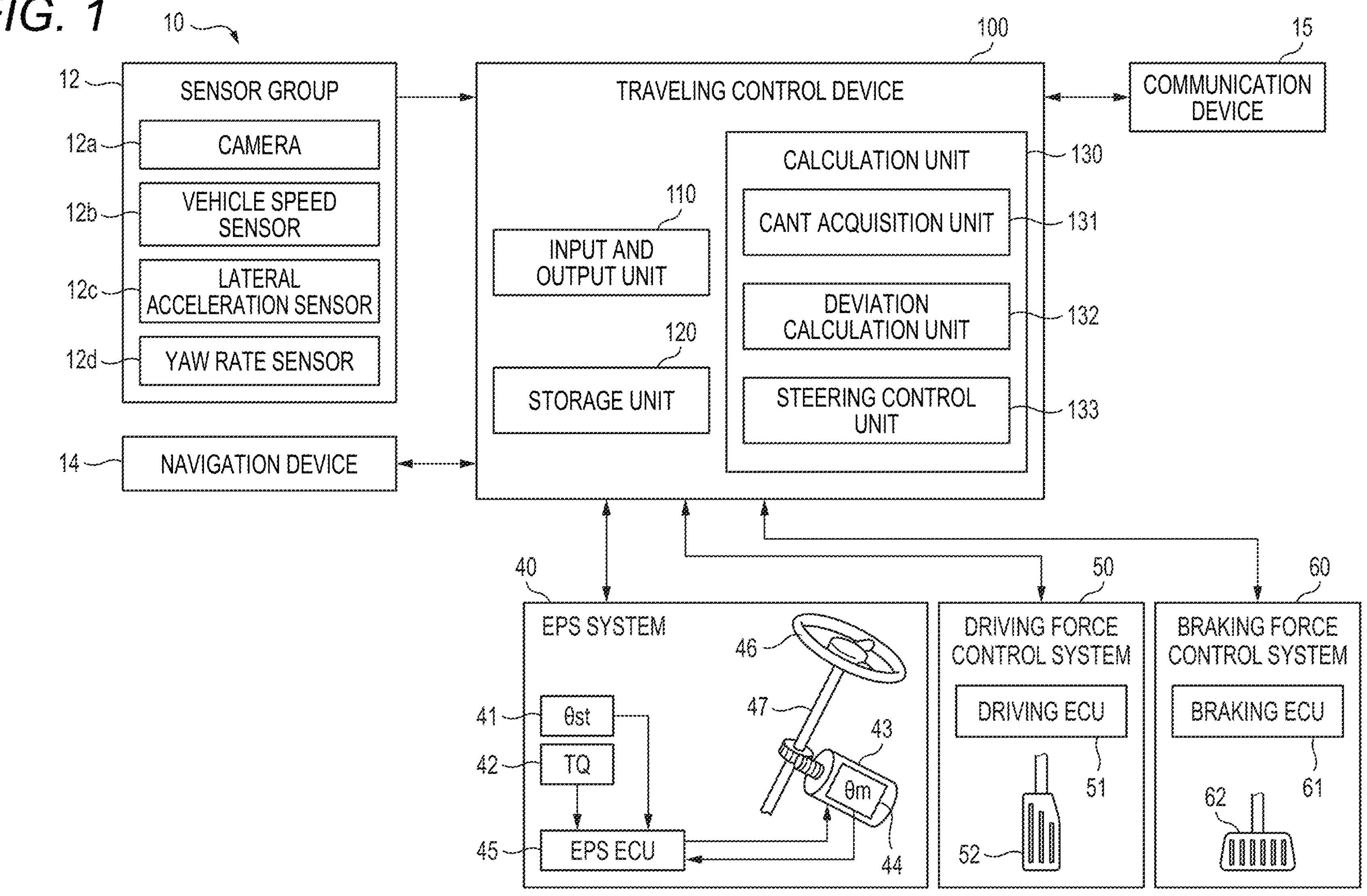
FIG. 1
10
SENSOR GROUP
12
CAMERA
12a
VEHICLE SPEED SENSOR
12b
LATERAL ACCELERATION SENSOR
12c
YAW RATE SENSOR
12d
NAVIGATION DEVICE
14
TRAVELING CONTROL DEVICE
100
INPUT AND OUTPUT UNIT
110
STORAGE UNIT
120
CALCULATION UNIT
130
CANT ACQUISITION UNIT
131
DEVIATION CALCULATION UNIT
132
STEERING CONTROL UNIT
133
COMMUNICATION DEVICE
15
EPS SYSTEM
40
θst
41
TQ
42
EPS ECU
45
46
47
43
θm
44
DRIVING FORCE CONTROL SYSTEM
50
DRIVING ECU
51
52
BRAKING FORCE CONTROL SYSTEM
60
BRAKING ECU
61
62

TRAVELING CONTROL DEVICE, TRAVELING CONTROL METHOD, AND STORAGE MEDIUM

This application is based upon and claims the benefit of priority from prior Japanese patent application No. 2024-10388, filed on Jan. 26, 2024, the entire contents of which are incorporated herein by reference.

TECHNICAL FIELD

The present disclosure relates to a traveling control device, a traveling control method, and a storage medium storing a program for controlling traveling of a vehicle along a target trajectory.

BACKGROUND ART

In recent years, efforts have been made to provide access to a sustainable transportation system in consideration of people vulnerable among traffic participants. In order to implement the above, focus has been placed on research and development on further improving safety and convenience of traffic by research and development related to driving assistance techniques. As the driving assistance techniques, there is known lane keeping assistance that assists a steering operation of a driver such that a vehicle travels near a center of a lane.

For example, JP7028115B discloses a vehicle steering assistance device that performs steering assistance control such that a host vehicle travels along a target traveling line. In particular, JP7028115B discloses that, during a cant switching period immediately after it is determined that a traveling road surface is switched from a non-cant road surface to a cant road surface, a control gain of an integral control term, which is set by integrating a lateral deviation of the host vehicle, is set to a value higher than a normal value.

Further, WO2022/259552 discloses a vehicle control device that controls steering of a host vehicle such that the host vehicle travels along a target traveling trajectory for lane change. In particular, WO2022/259552 discloses that the vehicle control device corrects a target steering angle based on an own lane gradient indicating a gradient of a road surface in a width direction of an own lane and an adjacent lane gradient indicating a gradient of a road surface in a width direction of an adjacent lane which is a lane change destination of the own lane, and performs steering control to follow the corrected target steering angle.

SUMMARY OF INVENTION

In a case where a cant angle of the road surface suddenly changes, for example, in a case where an inclination direction of the road surface suddenly changes from a right direction to a left direction or from the left direction to the right direction, a state where steering remains in a direction in which the vehicle drifts due to the cant may occur, and the vehicle may deviate from a target trajectory.

In JP7028115B, since a timing at which the control gain of the integral control term is set to a value higher than the normal value is immediately after it is determined that the non-cant road surface is switched to the cant road surface, the risk of deviation of the vehicle still remains in the case where the inclination direction of the cant changes suddenly. Further, in WO2022/259552, since the target steering angle is corrected based on the road surface gradient information obtained in advance from a map database, the risk of deviation of the vehicle caused by the sudden change in the inclination direction of the cant is not addressed. Regarding the sudden change in the cant angle, there is a room for consideration in preventing the deviation of the vehicle from the target trajectory.

Aspects of the present disclosure relate to providing a traveling control device, a traveling control method, and a storage medium storing a program capable of preventing a deviation of a vehicle from a target trajectory caused by a cant of a road surface when a cant angle of the road surface suddenly changes. This contributes to development of a sustainable transportation system.

According an aspect of the present disclosure, there is provided a traveling control device that controls traveling of a vehicle along a target trajectory, including:

a cant acquisition unit configured to acquire a cant angle indicating a degree of inclination in a lateral direction of a road surface on which the vehicle travels;

a deviation calculation unit configured to calculate a lateral deviation between a position of the target trajectory and a position of the vehicle in the lateral direction; and a control unit configured to calculate a target steering angle of the vehicle based on the cant angle and the lateral deviation and control steering of the vehicle to follow the target steering angle, in which a feedback term of the target steering angle calculated based on the cant angle and the lateral deviation is provided with a limit variably set according to the cant angle.

According another aspect of the present disclosure, there is provided a traveling control method for controlling traveling of a vehicle along a target trajectory, including:

a cant acquisition step of acquiring a cant angle indicating a degree of inclination in a lateral direction of a road surface on which the vehicle travels;

a deviation calculation step of calculating a lateral deviation between a position of the target trajectory and a position of the vehicle in the lateral direction; and a steering control step of calculating a target steering angle of the vehicle based on the cant angle and the lateral deviation and controlling steering of the vehicle to follow the target steering angle, in which a feedback term of the target steering angle calculated based on the cant angle and the lateral deviation is provided with a limit variably set according to the cant angle.

According another aspect of the present disclosure, there is provided a non-transitory computer-readable storage medium storing a program for controlling traveling of a vehicle along a target trajectory, the program causing a computer to perform:

a cant acquisition step of acquiring a cant angle indicating a degree of inclination in a lateral direction of a road surface on which the vehicle travels;

a deviation calculation step of calculating a lateral deviation between a position of the target trajectory and a position of the vehicle in the lateral direction; and a steering control step of calculating a target steering angle of the vehicle based on the cant angle and the lateral deviation and controlling steering of the vehicle to follow the target steering angle, in which a feedback term of the target steering angle calculated based on the cant angle and the lateral deviation is provided with a limit variably set according to the cant angle.

According to aspects of the present disclosure, when an inclination direction of a cant of the road surface suddenly changes, an increase in the lateral deviation of the vehicle with respect to the target trajectory may be reduced, and a deviation of the vehicle from the target trajectory may be prevented.

BRIEF DESCRIPTION OF DRAWINGS

Exemplary embodiment(s) of the present invention will be described in detail based on the following figures, wherein:

FIG. 1 is a block diagram showing an internal configuration of a vehicle equipped with a traveling control device according to an embodiment of the present disclosure;

DESCRIPTION OF EMBODIMENTS

Figure 2:
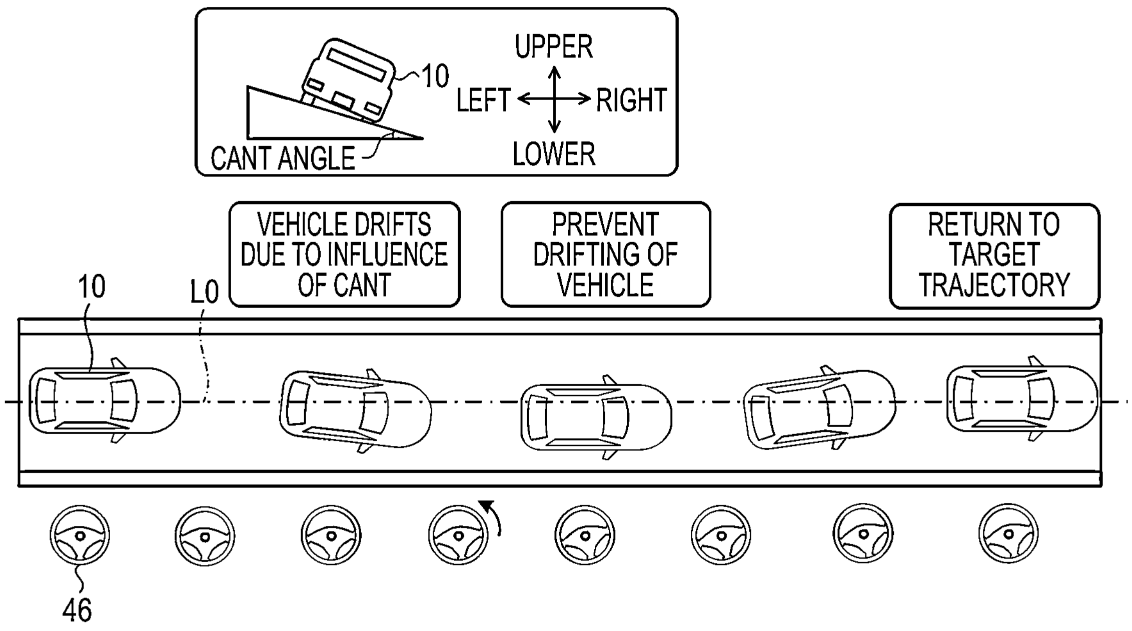
FIG. 2 is a diagram showing an example of a state where the vehicle in which lane keeping control is performed travels on a cant road inclined downward in a right direction.

Hereinafter, a traveling control device, a traveling control method, and a storage medium storing a program according to an embodiment of the present disclosure will be described with reference to the accompanying drawings.

FIG. 1 is a block diagram showing an internal configuration of a vehicle 10. The vehicle 10 includes a sensor group 12, a navigation device 14, a communication device 15, an electric power steering system 40 (also referred to as EPS system 40), a driving force control system 50, a braking force control system 60, and a traveling control device 100.

The sensor group 12 acquires various detection values to be used for control or the like by the traveling control device 100. The sensor group 12 includes, for example, a camera 12*a* that captures an image of surroundings of the vehicle 10, a vehicle speed sensor 12*b* that detects a speed of the vehicle 10, a lateral acceleration sensor 12*c* that detects an acceleration in a lateral direction (vehicle width direction) of the vehicle 10 (hereinafter also referred to as a lateral acceleration), and a yaw rate sensor 12*d* that detects a yaw rate that is an angular speed around a vertical axis of the vehicle 10. The sensor group 12 may further include other sensors, and may include, for example, a wheel sensor that detects a rotation speed of a wheel, and a gyro sensor that detects each speed in a predetermined direction.

The navigation device 14 detects a current position of the vehicle 10 using, for example, a global positioning system (GPS), and guides the user along a route to a destination. The navigation device 14 includes a storage device (not shown) including a map information database. The map information database may include, as road information, information related to a curvature of a curved road and a cant angle of a road surface to be described later.

The communication device 15 is a communication interface that performs communication with an external device. For example, a mobile communication network such as a cellular line, Wi-Fi (registered trademark), or Bluetooth (registered trademark) may be adopted for the communication between the vehicle 10 and the external device.

The EPS system 40 includes a steering angle sensor 41, a torque sensor 42, an EPS motor 43, a resolver 44, and an EPS electronic control unit (ECU) 45. The steering angle sensor 41 detects a steering angle θst of a steering wheel 46. The torque sensor 42 detects a torque TQ applied to the steering wheel 46. The EPS motor 43 applies a driving force or a reaction force to a steering column 47 connected to the steering wheel 46, thereby enabling assistance of an operation on the steering wheel 46. The resolver 44 detects a rotation angle θm of the EPS motor 43. The EPS ECU 45 controls the entire EPS system 40. Specifically, the EPS ECU 45 controls steering of the steering wheel 46 based on a command from a steering control unit 133 of the traveling control device 100 to be described later.

The driving force control system 50 includes a driving ECU 51, and performs driving force control on the vehicle 10. The driving ECU 51 controls a driving force of the vehicle 10 by controlling a motor, an internal combustion engine, or the like, which is a drive source of the vehicle 10, based on an accelerator operation by the user on an accelerator pedal 52.

The braking force control system 60 includes a braking ECU 61, and performs braking force control on the vehicle 10. The braking ECU 61 controls a braking force of the vehicle 10 by controlling a brake mechanism or the like based on a brake operation by the user on a brake pedal 62.

The traveling control device 100 has a driving assistance function of performing control related to traveling such as steering, driving, braking, and the like of the vehicle 10 and supporting driving of a driver. As one of the driving assistance function, the traveling control device 100 is configured to perform lane keeping control, for causing the vehicle 10 to travel on a target trajectory set in a lane, without relying on a driving operation of the driver or by assisting the driving operation. The target trajectory of the vehicle 10 is, for example, a center position of a lane in which the vehicle 10 travels, more specifically, a lane center line that is a center position between white lines provided on both left and right sides of the lane.

The traveling control device 100 includes an input and output unit 110, a storage unit 120, and a calculation unit 130. The calculation unit 130 is implemented by, for example, a central processing unit (CPU). The calculation unit 130 performs various types of control by controlling units based on a program stored in the storage unit 120. Further, the calculation unit 130 receives and outputs signals from and to units connected to the traveling control device 100 via the input and output unit 110.

The calculation unit 130 includes, for example, a cant acquisition unit 131 that acquires a cant angle of a road surface (hereinafter also referred to as a cant road) provided with a cant that is an inclination in a lateral direction of a road, a deviation calculation unit 132 that calculates a lateral deviation between a position of the target trajectory of the vehicle 10 and a current position of the vehicle 10 in the lateral direction, and a steering control unit 133 that controls steering of the vehicle 10.

The cant acquisition unit 131 acquires the cant angle based on detection results of the sensor group 12 such as the lateral acceleration of the vehicle 10 detected by the lateral acceleration sensor 12*c* and the yaw rate of the vehicle 10 detected by the yaw rate sensor 12*d*. The cant angle indicates a degree of inclination of the cant road in the lateral direction. The cant angle can be detected by various methods, and for example, the cant acquisition unit 131 may acquire the cant angle from a sensor (including the camera 12*a*) that detects an inclination of the road surface. Specifically, the cant acquisition unit 131 may acquire the cant angle based on a detection result of the camera 12*a*, or may acquire the cant angle based on a detection result of an inclination sensor that detects an inclination angle of the vehicle 10 in the vehicle width direction in a case where the sensor group 12 includes the inclination sensor. Further, the cant acquisition unit 131 may acquire information on a cant angle of a road registered in advance in the map information database or the like.

The deviation calculation unit 132 calculates the lateral deviation between the position of the target trajectory of the vehicle 10 and the current position of the vehicle 10 in the lateral direction based on detection information of the camera 12*a* and the like.

The steering control unit 133 transmits a steering control command to the EPS system 40 such that the vehicle 10 travels along the target trajectory.

FIG. 2 is a diagram showing an example of a state where the vehicle 10 in which the lane keeping control is performed travels on the cant road inclined downward in the right direction. In FIG. 2 (and FIG. 4 to be described later), the cant road is drawn linearly in a traveling direction of the vehicle 10, but may be curved (that is, a curved road).

When the vehicle 10 travels on the cant road, a yaw rate in the right direction with respect to a target trajectory L0 (one-dot chain line) is generated, and the vehicle 10 drifts in the right direction with respect to the target trajectory L0 and deviates from the target trajectory L0, and thus the traveling control device 100 performs control by the lane keeping control to prevent the drifting of the vehicle 10 in the right direction and return the vehicle 10 to the target trajectory L0. A target steering angle of the vehicle 10 at this time is set to a left direction opposite to a direction in which the vehicle 10 drifts due to the cant, with respect to a reference steering angle that follows the target trajectory L0 when there is no cant. Although not shown, when the vehicle 10 travels on a cant road inclined downward in the left direction, a yaw rate in the left direction with respect to the target trajectory L0 is generated, and the vehicle 10 drifts in the left direction with respect to the target trajectory L0 and deviates from the target trajectory L0, so that the traveling control device 100 performs control by the lane keeping control to prevent the drifting of the vehicle 10 in the left direction and return the vehicle 10 to the target trajectory L0. The target steering angle of the vehicle 10 at this time is set to the right direction opposite to a direction in which the vehicle 10 drifts due to the cant, with respect to the reference steering angle that follows the target trajectory L0 when there is no cant.

Figure 3:
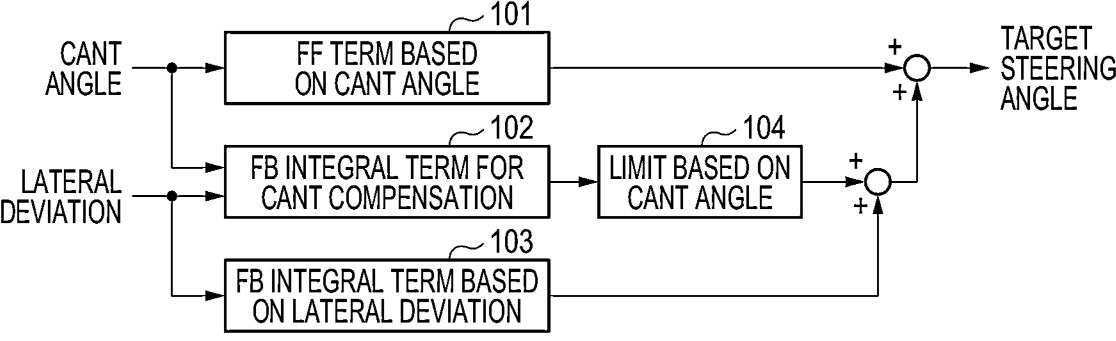
FIG. 3 is a control block diagram of the traveling control device when the vehicle travels on the cant road.

FIG. 3 is a control block diagram of the traveling control device 100 when the vehicle 10 travels on the cant road. The traveling control device 100 calculates the target steering angle by feedforward control and feedback control. In the following description and drawings, "feedforward" is also referred to as "FF", and "feedback" is also referred to as "FB".

The traveling control device 100 calculates the target steering angle based on an FF term 101 based on the cant angle, an FB integral term 102 for cant compensation, and an FB integral term 103 based on the lateral deviation. The FF term 101 is a term that secures high responsiveness, and the FB integral terms 102 and 103 are terms that compensate for a modeling error or disturbance influence on the FF term 101.

The FF term 101 of the target steering angle is set based on the cant angle detected by the cant acquisition unit 131. The FF term 101 is set by, for example, a mathematical expression or a map indicating a predetermined relationship between the cant angle and the target steering angle.

The FB integral term 102 of the target steering angle is a term that prevents, by the feedback control, lateral drifting of the vehicle 10 caused by the cant, and is set based on the cant angle and the lateral deviation. Specifically, the FB integral term 102 is a term for correcting the target steering angle such that the lateral deviation caused by the cant does not increase while the vehicle 10 is traveling on the cant road.

The FB integral term 103 of the target steering angle is a term for bringing the vehicle 10 closer to the target trajectory L0 by bringing the lateral deviation closer to zero by the feedback control, and is set based on the lateral deviation. Specifically, the FB integral term 103 is a term for correcting the target steering angle in a direction to reduce the lateral deviation while the vehicle 10 is traveling on the cant road.

The traveling control device 100 calculates the target steering angle by adding the FB integral term 102 and the FB integral term 103 to the FF term 101, and controls the steering of the vehicle 10 to follow the target steering angle.

Figure 4:
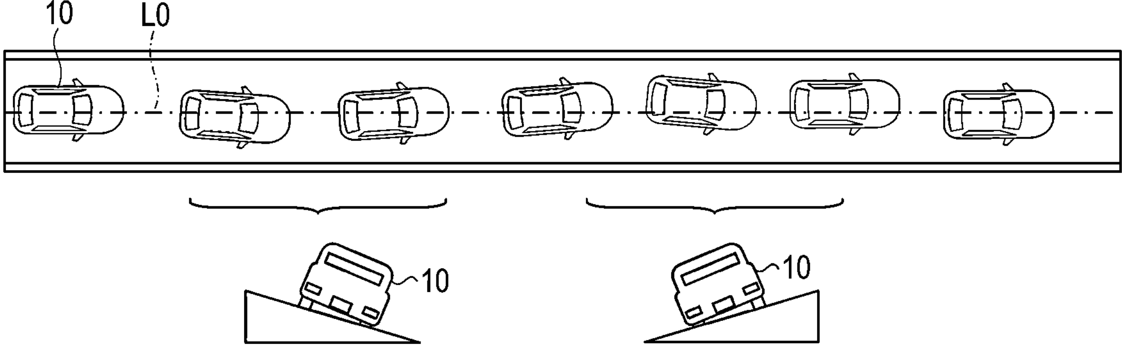
FIG. 4 is a diagram showing an example of a state where the vehicle travels on a road surface in which an inclination of a cant road suddenly changes from downward in the right direction to downward in a left direction.

As shown in FIG. 4, in a case where the inclination of the cant road suddenly changes from downward in the right direction to downward in the left direction in the traveling direction of the vehicle 10, a state may occur temporarily where the target steering angle in the left direction corresponding to the inclination downward in the right direction (specifically, the target steering angle in the left direction with respect to the reference steering angle) remains after the sudden change in an inclination direction. This is caused by, for example, an operation delay of the steering wheel 46 by the EPS system 40, a control delay of the FB control by the traveling control device 100, and an acquisition delay of the cant angle. At this time, since the direction in which the vehicle 10 drifts due to the downward inclination in the left direction and the direction of the target steering angle of the vehicle 10 are both the left direction, the lateral deviation of the vehicle 10 increases in the left direction, and the vehicle 10 may deviate greatly from the target trajectory L0.

Therefore, as shown in FIG. 3, the FB integral term 102 for cant compensation is provided with a limit 104 that is variably set according to the cant angle. Since the limit 104 is provided in the FB integral term 102, the calculated target steering angle is not increased more than necessary in response to the lateral drifting of the vehicle 10 caused by the cant. Accordingly, even if the inclination direction of the cant road suddenly changes, an increase in the lateral deviation of the vehicle 10 with respect to the target trajectory L0 can be reduced, and the deviation of the vehicle 10 from the target trajectory L0 may be prevented.

More specifically, since the traveling control device 100 calculates the target steering angle by adding the FB integral term 102, which is calculated based on the cant angle and the lateral deviation and is provided with the limit 104, to the FF term 101 calculated based on the cant angle, the target steering angle may be appropriately set by the FF control and the FB control which are based on the cant angle and lateral deviation.

FIGS. 5A to 5D are graphs illustrating a method of setting the limit 104. In each of the four graphs, a horizontal axis represents the cant angle, and a vertical axis represents the yaw rate. In the present descriptions, the cant angle of the cant road inclined downward in the left direction is defined as being positive, and the cant angle of the cant road inclined downward in the right direction is defined as being negative. Further, the yaw rate and the steering angle in the right direction with respect to the reference steering angle that follows the target trajectory L0 when there is no cant are defined being positive corresponding to the downward inclination in the left direction, and the yaw rate and the steering angle in the left direction with respect to the reference steering angle are defined as being negative corresponding to the downward inclination in the right direction.

First, the traveling control device 100 calculates an optimum yaw rate for the lateral drifting of the vehicle 10 caused by the cant. Specifically, the traveling control device 100 calculates an upper limit value of the yaw rate (hereinafter, also referred to as a yaw rate upper limit value) that can prevent the lateral drifting of the vehicle 10 caused by the cant without increasing the target steering angle more than necessary, and sets an optimum yaw rate that does not exceed the upper limit value. The yaw rate upper limit value is calculated based on, for example, the following Formula (1), and the graph is represented by a curve drawn by a thick solid line in FIG. 5A.

$$\gamma = Av/(1 + Av^2) \times g\sin\theta \quad (1)$$

Here, γ is the yaw rate upper limit value, A is a stability factor indicating a steering performance of the vehicle 10, v is the speed of the vehicle 10, g is a gravitational acceleration, and θ is the cant angle of the cant road. The yaw rate upper limit value is a function of the cant angle and is variable according to the cant angle. In the present descriptions, when the cant angle is positive, the yaw rate upper limit value takes a positive value (that is, the right direction), and when the cant angle is negative, the yaw rate upper limit value takes a negative value (that is, the left direction).

The yaw rate upper limit value is not limited to Formula (1), and may be calculated, for example, by further considering information on specifications of the vehicle 10, specifically, information such as a vehicle weight and a wheel base, with respect to Formula (1).

After calculating the yaw rate upper limit value, the traveling control device 100 specifies a first prohibition region R1 (shaded region in FIG. 5A) in which the yaw rate of the vehicle 10 exceeds the yaw rate upper limit value. Since the target steering angle is increased more than necessary when the target steering angle is set such that the yaw rate is included in the first prohibition region R1, the traveling control device 100 calculates an optimal target steering angle such that the yaw rate is not included in the first prohibition region R1. Specifically, when the cant angle is equal to or greater than zero, a region above the yaw rate upper limit value is the first prohibition region R1. When the cant angle is less than zero, a region below the yaw rate upper limit value is the first prohibition region R1.

Figure 5A:
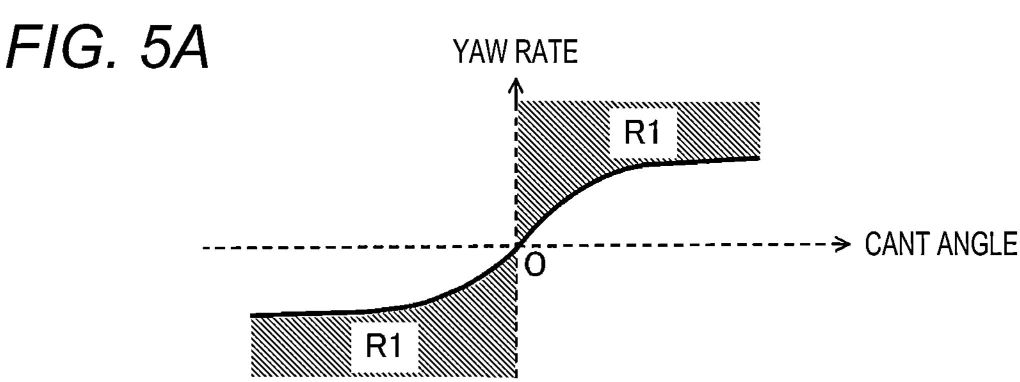
FIGS. 5A to 5D are diagrams illustrating a method of setting a limit.
Figure 5B:
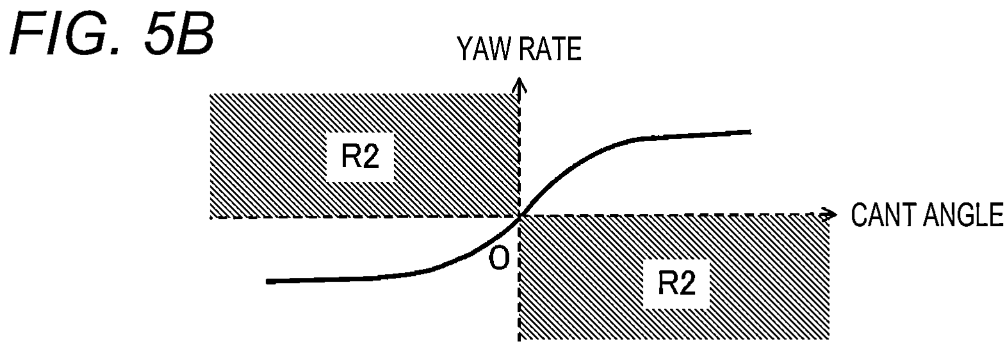

Next, as shown in FIG. 5B, the traveling control device 100 specifies a second prohibition region R2 that satisfies a condition that the direction of the yaw rate does not match the direction in which the vehicle 10 drifts due to the cant. Since the target steering angle is set in a direction in which the lateral deviation increases when the yaw rate is included in the second prohibition region R2, the traveling control device 100 calculates the target steering angle such that the yaw rate is not included in the second prohibition region R2. Specifically, when the cant angle is equal to or greater than zero, a region where the yaw rate is negative, that is, a region where the yaw rate is in the left direction with respect to the reference steering angle is the second prohibition region R2. When the cant angle is less than zero, a region where the yaw rate is positive, that is, a region where the yaw rate is in the right direction with respect to the reference steering angle is the second prohibition region R2.

Figure 5C:
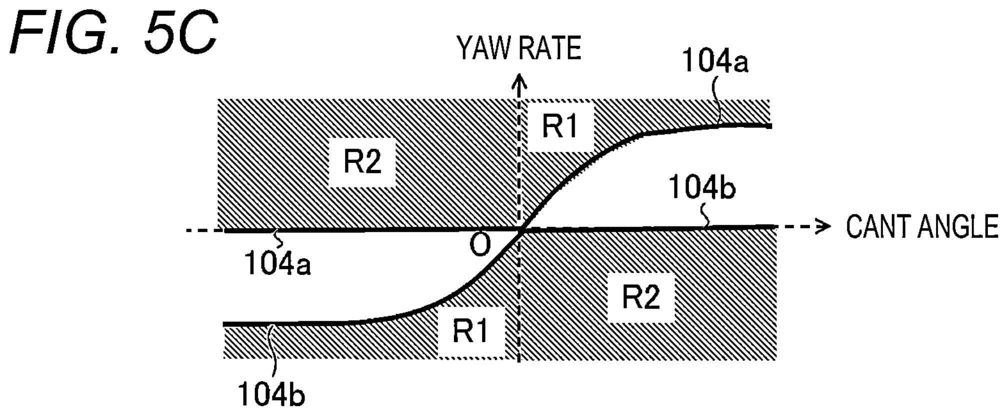

Next, as shown in FIG. 5C, the traveling control device 100 combines the first prohibition region R1 and the second prohibition region R2 specified in FIGS. 5A and 5B. The traveling control device 100 sets, as a limit, a lower edge portion (hereinafter, also referred to as an upper boundary 104*a*) of the first prohibition region R1 and the second prohibition region R2 which are on upper sides of the graphs and an upper edge portion (hereinafter, also referred to as a lower boundary 104*b*) of the first prohibition region R1 and the second prohibition region R2 which are on lower sides of the graphs. The "limit" here is a value before adjustment shown in FIG. 5D.

Figure 5D:
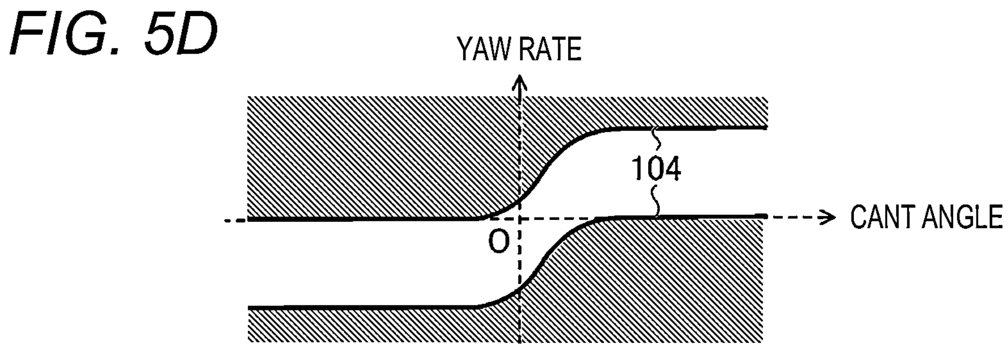

Finally, as shown in FIG. 5D, the traveling control device 100 adjusts the limit such that the limit functions even when the cant angle is near zero. Accordingly, generation of control noise can be prevented. Specifically, setting of the limit 104 shown in FIG. 3 is completed by blunting the upper boundary 104*a* and the lower boundary 104*b* when the cant angle is near zero, and providing a predetermined width between the upper boundary 104*a* and the lower boundary 104*b*.

The traveling control device 100 sets the target steering angle such that the yaw rate does not exceed the limit 104, specifically, such that the yaw rate is not increased to be larger than the upper boundary 104*a* of the limit 104 and is not decreased to be smaller than the lower boundary 104*b* of the limit 104.

The setting of the limit 104 described above is performed, for example, when movement of the vehicle 10 in the lateral direction due to the cant road is detected, in other words, before the inclination direction of the cant road suddenly changes. Accordingly, the limit 104 may be appropriately set in advance before the inclination direction of the cant road suddenly changes. However, a setting timing of the limit 104 is not limited thereto, and the limit 104 may be set when a cant road ahead is detected by the camera 12*a* or the like before traveling on the cant road (that is, during traveling on a flat road), or the limit 104 may be set by referring to the map information database during traveling on a flat road, recognizing the cant road in advance and acquiring information on the cant angle.

Figure 6:
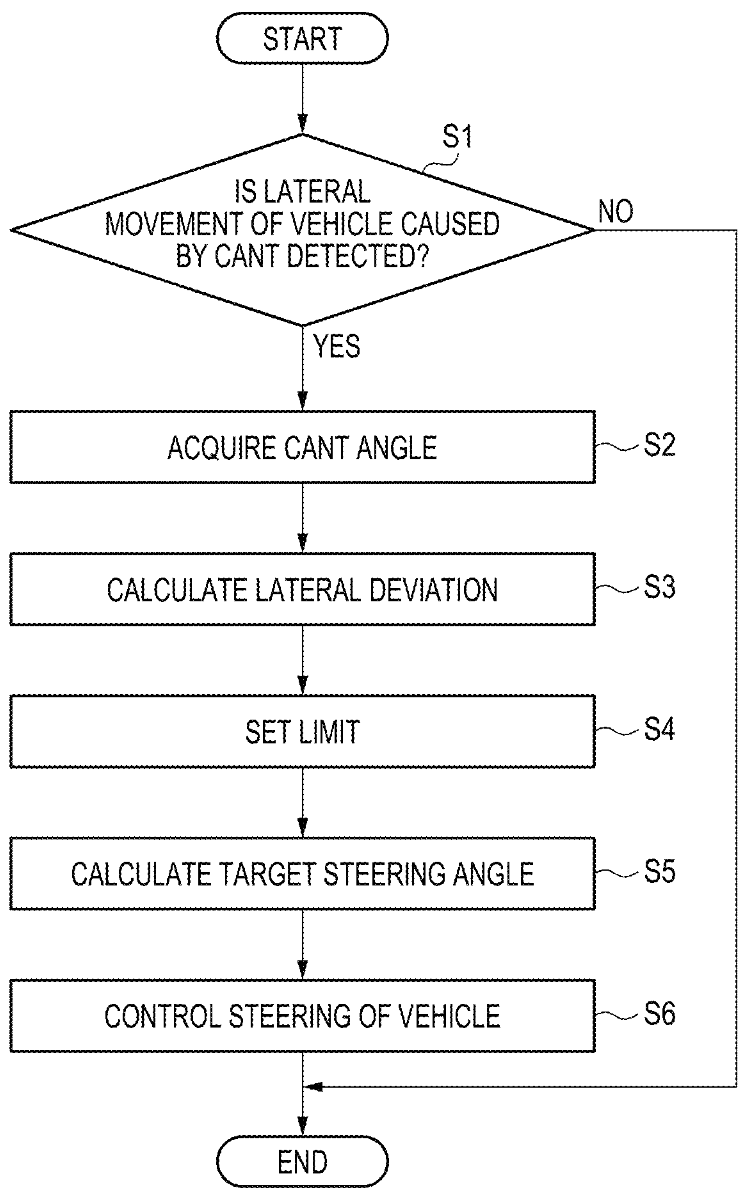
FIG. 6 is an example of a flowchart of control to be performed by the traveling control device.

FIG. 6 shows an example of a flowchart of the control to be performed by the traveling control device 100. The traveling control device 100 repeatedly performs, for example, the flowchart of FIG. 6 at predetermined intervals.

The traveling control device 100 determines whether lateral movement of the vehicle 10 caused by the cant is detected (step S1). When the lateral movement is not detected (step S1: NO), the traveling control device 100 ends the flowchart.

When the lateral movement is detected (step S1: YES), the traveling control device 100 acquires the cant angle of the road surface (step S2) and calculates the lateral deviation of the vehicle 10 (step S3). Steps S2 and S3 may be reversed in order or may be performed simultaneously.

Subsequently, the traveling control device 100 sets the limit 104 by the above-described method (step S4), and calculates the target steering angle in consideration of the limit 104 (step S5). Then, the traveling control device 100 controls the steering of the vehicle 10 to follow the target steering angle (step S6).

The control method described in the above embodiment may be implemented by executing a program prepared in advance on a computer. The program is stored in a computer-readable storage medium and executed by being read from the storage medium. In addition, the program may be provided in a form stored in a non-transitory storage medium such as a flash memory, or may be provided via a network such as the Internet. The computer that executes the present program may be provided in the control device, may be provided in an electronic device such as a smartphone, a tablet terminal, or a personal computer that can communicate with the control device, or may be provided in a server device that can communicate with the control device and the electronic device.

Although one embodiment of the present disclosure has been described above with reference to the accompanying drawings, it is needless to say that the present disclosure is not limited to the embodiment. It is apparent that those skilled in the art may conceive of various modifications and changes within the scope described in the claims, and it is understood that such modifications and changes naturally fall within the technical scope of the present disclosure. In addition, the constituent elements in the above embodiment may be freely combined without departing from the gist of the invention.

For example, when an amount of deviation between a current steering angle and the target steering angle is large when the vehicle 10 is traveling on the cant road, a change amount in the steering angle per unit time for approaching the target steering angle may be limited. Accordingly, a sudden increase in the yaw rate of the vehicle 10 can be prevented.

Further, a dead zone in which the steering control based on the cant angle is not performed when the cant angle is close to zero may be provided in order to reduce extra steering control of the traveling control device 100 when the vehicle 10 travels on a road surface provided with no cant.

In the above-described embodiment, the traveling control device 100 calculates the target steering angle by adding the FB integral term 102 for cant compensation and the FB integral term 103 based on the lateral deviation to the FF term 101, but the target steering angle may be calculated by further adding a FB differential term based on the lateral deviation, an FB term based on an attitude angle, and the like.

In the above-described embodiment, the traveling control device 100 calculates the limit 104 based on predetermined information (for example, the vehicle speed, the stability factor, and the information on the specifications) related to the vehicle 10, but the limit 104 may be calculated by further considering a slip angle and a friction coefficient of the road surface, for example.

In the present descriptions, at least the following matters are described. In the parentheses, the corresponding constituent elements and the like in the above embodiment are shown as an example, but the present invention is not limited thereto.

(1) A traveling control device (traveling control device 100) that controls traveling of a vehicle (vehicle 10) along a target trajectory (target trajectory L0), including:

a cant acquisition unit (cant acquisition unit131) configured to acquire a cant angle indicating a degree of inclination in a lateral direction of a road surface on which the vehicle travels;

a deviation calculation unit (deviation calculation unit 132) configured to calculate a lateral deviation between a position of the target trajectory and a position of the vehicle in the lateral direction; and a control unit (steering control unit 133) configured to calculate a target steering angle of the vehicle based on the cant angle and the lateral deviation and control steering of the vehicle to follow the target steering angle, in which a feedback term (FB integral term 102) of the target steering angle calculated based on the cant angle and the lateral deviation is provided with a limit (limit 104) variably set according to the cant angle.

When an inclination direction of a cant of a road surface suddenly changes (specifically, in a case of sudden change from a right direction to a left direction or from the left direction to the right direction), a state where the steering remains in a direction in which the vehicle drifts due to the cant may occur, and the vehicle may deviate from the target trajectory. According to (1), since the feedback term of the target steering angle is provided with the limit variably set according to the cant angle, even when the inclination direction of the cant of the road surface suddenly changes, an increase in the lateral deviation of the vehicle with respect to the target trajectory may be reduced, and the deviation of the vehicle from the target trajectory may be prevented. Even if the road surface suddenly changes from a cant road to a non-cant road, the increase in the lateral deviation of the vehicle with respect to the target trajectory can be reduced and the deviation of the vehicle from the target trajectory may be prevented.

(2) The traveling control device according to (1), in which the limit is set based on a yaw rate upper limit value variably set according to the cant angle and calculated based on predetermined information related to the vehicle, and a condition that a direction of a yaw rate of the vehicle does not match a downward inclination direction of the road surface.

According to (2), by the limit set based on the yaw rate of the vehicle, the target steering angle may be prevented from being set in a direction in which the lateral deviation of the vehicle is increased.

(3) The traveling control device according to (2), in which the yaw rate upper limit value is calculated based on a speed of the vehicle.

According to (3), an appropriate limit may be set in consideration of the speed of the vehicle.

(4) The traveling control device according to (2) or (3), in which the yaw rate upper limit value is calculated based on information on specifications of the vehicle.

According to (4), an appropriate limit may be set in consideration of the information on the specifications of the vehicle.

(5) The traveling control device according to any one of (1) to (4), in which the control unit sets the limit when movement of the vehicle in the lateral direction caused by a cant of the road surface is detected.

According to (5), the limit may be appropriately set in advance before the inclination direction of the cant of the road surface suddenly changes.

(6) The traveling control device according to any one of (1) to (5), in which the cant acquisition unit acquires the cant angle based on at least one of a detection result of a sensor (lateral acceleration sensor 12*c*, yaw rate sensor 12*d*) that detects a lateral acceleration of the vehicle, a detection result of a sensor (inclination sensor, camera 12*a*) that detects an inclination of the road surface, and map information.

According to (6), the cant angle may be appropriately acquired based on the sensor, the map information, or the like.

(7) The traveling control device according to any one of (1) to (6), in which the control unit calculates the target steering angle by adding a feedback term, which is calculated based on the cant angle and the lateral deviation and is provided with the limit, to a feedforward term (FF term 101) calculated based on the cant angle.

According to (7), the target steering angle may be set appropriately by the feedforward control and the feedback control which are based on the cant angle and the lateral deviation.

(8) A traveling control method for controlling traveling of a vehicle (vehicle 10) along a target trajectory (target trajectory L0), including:

a cant acquisition step of acquiring a cant angle indicating a degree of inclination in a lateral direction of a road surface on which the vehicle travels;

a deviation calculation step of calculating a lateral deviation between a position of the target trajectory and a position of the vehicle in the lateral direction; and a steering control step of calculating a target steering angle of the vehicle based on the cant angle and the lateral deviation and controlling steering of the vehicle to follow the target steering angle, in which a feedback term (FB integral term 102) of the target steering angle calculated based on the cant angle and the lateral deviation is provided with a limit (limit 104) variably set according to the cant angle.

When an inclination direction of a cant of a road surface suddenly changes (specifically, in a case of sudden change from a right direction to a left direction or from the left direction to the right direction), a state where the steering remains in a direction in which the vehicle drifts due to the cant may occur, and the vehicle may deviate from the target trajectory. According to (8), since the feedback term of the target steering angle is provided with the limit variably set according to the cant angle, even when the inclination direction of the cant of the road surface suddenly changes, an increase in the lateral deviation of the vehicle with respect to the target trajectory may be reduced, and the deviation of the vehicle from the target trajectory can be prevented.

(9) A non-transitory computer-readable storage medium storing a program for controlling traveling of a vehicle (vehicle 10) along a target trajectory (target trajectory L0), the program causing a computer (traveling control device 100) to perform:

a cant acquisition step of acquiring a cant angle indicating a degree of inclination in a lateral direction of a road surface on which the vehicle travels;

a deviation calculation step of calculating a lateral deviation between a position of the target trajectory and a position of the vehicle in the lateral direction; and a steering control step of calculating a target steering angle of the vehicle based on the cant angle and the lateral deviation and controlling steering of the vehicle to follow the target steering angle, in which a feedback term (FB integral term 102) of the target steering angle calculated based on the cant angle and the lateral deviation is provided with a limit (limit 104) variably set according to the cant angle.

When an inclination direction of a cant of a road surface suddenly changes (specifically, in a case of sudden change from a right direction to a left direction or from the left direction to the right direction), a state where the steering remains in a direction in which the vehicle drifts due to the cant may occur, and the vehicle may deviate from the target trajectory. According to (9), since the feedback term of the target steering angle is provided with the limit variably set according to the cant angle, even when the inclination direction of the cant of the road surface suddenly changes, an increase in the lateral deviation of the vehicle with respect to the target trajectory may be reduced, and the deviation of the vehicle from the target trajectory may be prevented.

What is claimed is:

1. A traveling control device that controls traveling of a vehicle along a target trajectory, comprising:

a cant acquisition unit configured to acquire a cant angle indicating a degree of inclination in a lateral direction of a road surface on which the vehicle travels;

a deviation calculation unit configured to calculate a lateral deviation between a position of the target trajectory and a position of the vehicle in the lateral direction; and a control unit configured to calculate a target steering angle of the vehicle based on the cant angle and the lateral deviation and control steering of the vehicle to follow the target steering angle, wherein a feedback term of the target steering angle calculated based on the cant angle and the lateral deviation is provided with a limit variably set according to the cant angle, the target steering angle is set within the limit, and the cant acquisition unit, the deviation calculation unit, and the control unit are each implemented via at least one processor.

2. The traveling control device according to claim 1, wherein the limit is set based on a yaw rate upper limit value variably set according to the cant angle and calculated based on predetermined information related to the vehicle, and a condition that a direction of a yaw rate of the vehicle does not match a downward inclination direction of the road surface.

3. The traveling control device according to claim 2, wherein the yaw rate upper limit value is calculated based on a speed of the vehicle.

4. The traveling control device according to claim 2, wherein the yaw rate upper limit value is calculated based on information on specifications of the vehicle.

5. The traveling control device according to claim 1, wherein the control unit sets the limit when movement of the vehicle in the lateral direction caused by a cant of the road surface is detected.

6. The traveling control device according to claim 1, wherein the cant acquisition unit acquires the cant angle based on at least one of a detection result of a sensor that detects a lateral acceleration of the vehicle, a detection result of a sensor that detects an inclination of the road surface, and map information.

7. The traveling control device according to claim 1, wherein the control unit calculates the target steering angle by adding a feedback term, which is calculated based on the cant angle and the lateral deviation and is provided with the limit, to a feedforward term calculated based on the cant angle.

8. A traveling control method for controlling traveling of a vehicle along a target trajectory, comprising:

a cant acquisition step of acquiring a cant angle indicating a degree of inclination in a lateral direction of a road surface on which the vehicle travels;

a deviation calculation step of calculating a lateral deviation between a position of the target trajectory and a position of the vehicle in the lateral direction; and a steering control step of calculating a target steering angle of the vehicle based on the cant angle and the lateral deviation and controlling steering of the vehicle to follow the target steering angle, wherein a feedback term of the target steering angle calculated based on the cant angle and the lateral deviation is provided with a limit variably set according to the cant angle, and the target steering angle is set within the limit.

9. A non-transitory computer-readable storage medium storing a program for controlling traveling of a vehicle along a target trajectory, the program causing a computer to perform:

a cant acquisition step of acquiring a cant angle indicating a degree of inclination in a lateral direction of a road surface on which the vehicle travels;

a deviation calculation step of calculating a lateral deviation between a position of the target trajectory and a position of the vehicle in the lateral direction; and a steering control step of calculating a target steering angle of the vehicle based on the cant angle and the lateral deviation and controlling steering of the vehicle to follow the target steering angle, wherein a feedback term of the target steering angle calculated based on the cant angle and the lateral deviation is provided with a limit variably set according to the cant angle, and the target steering angle is set within the limit.

* * * * *